United States Patent
Hashimoto

(10) Patent No.: US 6,437,319 B1
(45) Date of Patent: Aug. 20, 2002

(54) OPTICAL DEVICE

(75) Inventor: Nobuyuki Hashimoto, Iruma (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/508,173

(22) PCT Filed: Sep. 10, 1998

(86) PCT No.: PCT/JP98/04089

§ 371 (c)(1),
(2), (4) Date: Mar. 8, 2000

(87) PCT Pub. No.: WO99/13464

PCT Pub. Date: Mar. 18, 1999

(30) Foreign Application Priority Data

Sep. 10, 1997 (JP) .............................. 9-245274
Sep. 12, 1997 (JP) .............................. 9-248547

(51) Int. Cl.[7] .............................. G02F 1/01; H01J 40/14
(52) U.S. Cl. ..................... 250/225; 250/201.5; 250/216
(58) Field of Search .............................. 250/201.5, 225, 250/216, 201.1; 369/44.14, 44.23, 44.11, 44.12

(56) References Cited

U.S. PATENT DOCUMENTS

| 5,745,465 A | | 4/1998 | Tsai et al. | |
| 5,841,489 A | * | 11/1998 | Yoshida et al. | 349/17 |
| 5,875,167 A | * | 2/1999 | Katayama | 369/112 |

FOREIGN PATENT DOCUMENTS

| EP | 0 731 457 A | | 9/1996 |
| EP | 0 762 398 A1 | | 3/1997 |
| JP | 6-124477 | * | 5/1994 |
| JP | 9-106566 | * | 4/1997 |
| JP | 9-198702 | * | 7/1997 |
| JP | 9-223324 | * | 8/1997 |

OTHER PUBLICATIONS

Proc. Int. Symp. on Optical Memory, 1989, Japanese Journal of Applied Physics, vol. 28 (1989) Supplement 28–3, pp. 197–200.*

* cited by examiner

Primary Examiner—Robert H. Kim
Assistant Examiner—Courtney Thomas
(74) Attorney, Agent, or Firm—Armstrong, Westerman & Hattori, LLP

(57) ABSTRACT

In an optical apparatus comprising a condensing optics (104) for condensing incident light of linearly polarized light (10), an optical splitting element (701) for splitting reflected light reflected by a light reflection member (105) disposed in close proximity of the focal plane of the condensing optics (104) from the incident light, and an optical detection element (704) for detecting a split light beam (12) split by the optical splitting element, an optical rotatory element (103), capable of optically rotating substantially 90° a polarization axis of the linearly polarized light in a region thereof, corresponding to a portion of an effective light beam (11) of the linearly polarized light, available for the condensing optics (104), and also controlling an optical rotatory power thereof by electric signals, is disposed in the optical path of the incident light of the linearly polarized light (10), Further, a linearly polarized light detection element (703) is disposed in the optical path of the split light beam (12). As a result, a superresolved image can be formed without causing attenuation in light amount, and sidelobes can be removed with ease from the split light beam split from the reflected light, thereby improving a SN ratio of detected signals. In addition, it is also possible to obtain detected light in a condition where an aperture of the condensing optics has been switched over.

14 Claims, 10 Drawing Sheets

OPTICAL DEVICE

TECHNICAL FIELD

The present invention relates to a superresolving optical apparatus, applicable to optical disc systems, and the like. More particularly, the invention is concerned with an optical apparatus which has a high optical utilization ratio and is yet capable of electrically altering a numerical aperture thereof with ease, with respect to optical discs whose proper numerical apertures for image formation differ from each other, such as DVDs (digital versatile discs), CDs (compact discs), and the like.

BACKGROUND TECHNOLOGY

A theoretical resolution limit and a numerical aperture of an optical system is briefly described hereinafter to facilitate an understanding of the conventional technologies concerned.

In an optical system designed to have little aberration according to geometrical optics, a focused point must in theory be infinitely small in size. However, it has, in fact, a spatial spread in a finite size due to the effect of optical diffraction owing to the wave motion characteristic of light.

Provided that a numerical aperture of an optical system, contributing to optical image formation or condensing of light, is designated NA, the spatial spread of a focused point is defined by the following formula:

$$k \times \lambda \div NA \qquad (1)$$

where $\lambda$ is the wavelength of light, and k is a constant for respective optical systems (a value, normally in the range from 1 to around 2). Further, the numerical aperture NA is proportional to a ratio of the diameter D of an effective entrance pupil of an optical system (generally the diameter of an effective light beam) to a focal length f, that is: D/f.

The spatial spread of the focused point as expressed by formula represents a theoretical resolution limit of the optical system, and is also called a diffraction limit.

As is evident from formula, a theoretical resolution may be enhanced by the use of a light beam at a shorter wavelength $\lambda$, or by enlarging the numerical aperture NA of an optical system. However, a short wavelength light source is generally complex in construction, and higher in production cost.

This tendency becomes more pronounced, particularly, in the case of a laser light source used for optical disc systems, photolithographic masking systems, and the like. Further, the greater the numerical aperture NA of an optical system is, the more the optical system becomes prone to aberration according to geometrical optics. Accordingly, for recording information on common optical disc systems, a semiconductor laser for emitting a light beam at a wavelength in the order of 700 nm is used as a light source while a condensing optics having the numerical aperture NA on the order of 0.5 is used.

As the conventional technology capable of achieving superresolution by the use of a light source and condensing optics as described above, a superresolving optical system constructed such that a portion of an effective light beam falling on the condensing optics is shielded with a shielding band (shielding plate) is well known (reference: Japanese Journal of Applied Physics, Vol. No. 28 (1989) Supplement 28-3, pp. 197–200). With this superresolving optical system using the shielding plate, a focused spot size is rendered narrower by 10 to 20% with respect to the theoretical resolution limit of the optical system.

However, shielding a portion of the effective light beam falling on the condensing optics by means of the shielding plate will result in a lower optical utilization ratio. Furthermore, with the superresolving optical system described above wherein the central region of a light beam, including the optical axis, is shielded with the shielding plate, degradation in the optical utilization ratio becomes further pronounced because the central region of the light beam generally belongs to a higher intensity zone according to the distribution of light intensity.

Such a low optical utilization ratio inevitably requires the use of a light source capable of outputting higher power, resulting in a higher cost of an optical apparatus because such a high power output light source is expensive. Particularly, for application to optical disc systems, a semiconductor laser light source, expensive even at a low power output, is used, and consequently, it is practically impossible to employ a high power output light source from a cost point of view.

Further, when a portion of the effective light beam falling on the condensing optics is shielded by means of the shielding plate, sidelobes typical of a superresolution phenomenon occur on both sides of the focused spot. According to the technology referred to in the literature described in the foregoing, the sidelobes are shielded by installing a slit at a position where signal light reflected from the focused spot is condensed by a condenser lens, so that a focused spot with the sidelobes substantially removed is formed by another condenser lens installed after the slit.

However, for condensing light by an additional condenser lens, an additional optical path of the optical system is required to that extent, and the number of components of the optical system increases, thereby causing a configuration of the optical system to become more complex. Further, delicate positioning of the slit is required because any deviation in the position of the slit will result in shielding of not only the sidelobes but also the focused spot. In addition, there will arise a problem of dust and the like sticking to a gap in the slit.

Then, even if the slit is installed in a given position, the fact remains that light is shielded by the slit, and consequently, diffraction of light occurs again, resulting in the occurrence of some sidelobes. Further, shielding of light by means of the shielding plate naturally leads to a significant degradation in the optical utilization ratio.

The invention has been developed in light of the circumstances described above, and the first object of the invention is to achieve detection of the signal light reflected from the focused spot of superresolution without causing degradation in the optical utilization ratio while solving a problem of sidelobe as well.

Further, as the formula (1) shown in the foregoing clearly indicates, a theoretical resolution of an optical system is largely dependent on a numerical aperture thereof. A numerical aperture of a condenser (objective) lens of an optical pickup used in optical disc systems is usually in the order of 0.45 in the case of CDs and CD-ROMs, and in the order of 0.55 in the case of DVDs (digital versatile discs). Meanwhile, an optical disc substrate has a thickness of about 1.2 mm for use in CDs, and about 0.6 mm for use in DVDs. The condenser lens of an optical pickup that is required for condensing light up to the diffraction limit is designed by taking into account even a thickness of the optical disc substrate. Hence, a proper numerical aperture of the condenser lens for use in CDs or CD-ROMs is different from that of the condenser lens for use in DVDs, thus preventing common use of the optical pickup therebetween.

Accordingly, in order to overcome this problem, there have been in use various conventional methods such as a method of installing two units of optical pickups in one optical apparatus, a method of creating two focal points by making a condenser lens of an optical pickup to be imprinted with a hologram, a method of switching over the diameter of an effective entrance pupil by use of a liquid crystal shutter, and so forth.

However, if two units of optical pickups are installed in one optical apparatus, this will result in a complex configuration of the optical apparatus, leading to an increase in manufacturing cost. If two focal points are created by imprinting the condenser lens with a hologram, it follows that one unnecessary focused spot at either of the focal points will always occur, resulting in a degradation of the optical utilization ratio. This will pose a problem with devices requiring a large light amount such as DVD-RAMs, that is, writable and rewritable DVDs. Similarly, the method of using the liquid crystal shutter also will pose the same problem of degradation in the optical utilization ratio, because a portion of transmitted light is absorbed by polarizers making up the liquid crystal shutter.

The second object of the invention is to enable the use of a common optical apparatus (optical pickup) with respect to optical discs having differing proper numerical apertures for image formation such as DVDs, CDs, and so forth, and to enable numerical apertures to be electrically switched with ease without causing much degradation in the optical utilization ratio.

DISCLOSURE OF THE INVENTION

The present invention has been developed in order to attain the first and second objects described above by using substantially common means.

That is, with an optical apparatus according to the invention, comprising a condensing optics for condensing incident light of linearly polarized light, an optical splitting element for splitting reflected light reflected by a light reflection member disposed in close proximity of the focal plane of the condensing optics from the incident light, and an optical detection element for detecting a split light beam split by the optical splitting element, in order to attain the first object described above, an optical rotatory element capable of optically rotating substantially 90° a polarization axis of the linearly polarized light in a region corresponding to a portion of an effective light beam of the linearly polarized light, available for the condensing optics, and also controlling an optical rotatory power thereof by electric signals is disposed in the above-described optical path of the incident light of the linearly polarized light, and a linearly polarized light detection element is disposed in the optical path of the above-described split light beam.

Thus, by disposing the optical rotatory element capable of controlling the optical rotatory power thereof by use of electric signals in the optical path of the incident light of the linearly polarized light, and by dividing the effective light beam of the linearly polarized light into the regions where the polarization axes thereof cross each other at right angles, a superresolving optical system is established without shading, in theory, the light beam. Further, by disposing the linearly polarized light detection element in the optical path for the reflected light formed after a superresolved focused spot is reflected by the light reflection member, sidelobes can be removed from reflected signal light without the use of a slit and a condenser lens.

It is desirable that the direction of the detection axis of the linearly polarized light detection element is set in the range of minus 85° to minus 5° or from 5° to 85°, that is, in a range excluding around minus 90°, 0°, and 90°, with respect to the direction of the polarization axis of the linearly polarized light falling on the optical rotatory element.

It is preferable that a liquid crystal element wherein a region having a function of optically rotating the polarization axis of the linearly polarized light 90° and a region not having such an optically rotatory function are caused to occur by applying a voltage to liquid crystals in a portion of the light transmitting region thereof is used for the optical rotatory element, and the liquid crystal element is disposed such that an alignment direction of liquid crystal molecules on a side of the liquid crystal element, where the linearly polarized light falls, is set to coincide with, or cross at right angles to the direction of the polarization axis of the linearly polarized light.

As the liquid crystal element, a 90° twisted-nematic liquid crystal element having transparent electrodes for applying a voltage to liquid crystals in a portion of the light transmitting region can be used, so that liquid crystal molecules in the portion to which a voltage is applied via the transparent electrodes turn into homeotropic alignment, thereby losing the 90° optical rotatory power thereof.

A portion of a region where the polarization axis of the linearly polarized light is optically rotated 90° by the optical rotatory element, preferably corresponds to a substantially circular region centering around the optical axis of the linearly polarized light, or a region other than the substantially circular region, within the effective light beam available for the condensing optics.

Otherwise, a portion of the region where the polarization axis of the linearly polarized light is optically rotated 90° by the optical rotatory element may correspond to a substantially oblong region centering around the optical axis of the linearly polarized light, or a region other than the substantially oblong region, within the effective light beam available for the condensing optics.

In the cases described above, an area of the substantially circular region, occupied within the effective light beam, is preferably in the range of 1 to 20% of an area on a plane orthogonal to the optical axis, occupied by the effective light beam.

Further, in the case of an oblong region, an area of the substantially oblong region, occupied within the effective light beam, is preferably in the range of 10 to 40% (more preferably about 20%) of an area on a plane orthogonal to the optical axis, occupied by the effective light beam.

With the optical apparatus according to the invention, wherein the region where the polarization axis of the linearly polarized light is optically rotated 90° by the optical rotatory element corresponds to the substantially circular region centering around the optical axis of the linearly polarized light, or the region other than the substantially circular region, within the effective light beam available for the condensing optics, the second object of the invention described above can be attained by disposing the linearly polarized light detection element having the detection axis thereof, which is oriented so as to substantially coincide with or to cross at right angles the direction of the polarization axis of the incident linearly polarized light, in the optical path of the split light beam, split from the incident light by the optical splitting element after a superresolved focused spot is reflected by the light reflection member.

That is, the optical apparatus of the invention can be used as an optical pickup for common use in DVDs and CDs etc, for which different proper numerical apertures are required for image formation, and when the linearly polarized light passing through the substantially circular region or the region other than the substantially circular region is optically rotated 90° by controlling the optical rotatory power of the optical rotatory element by use of electric signals, the substantial numerical apertures can be switched over without causing degradation in the optical utilization ratio. Furthermore, sidelobes can be removed from the reflected signal light by the agency of the linearly polarized light detection element.

In this case, an area of the substantially circular region, occupied within the effective light beam, is preferably set to be in the range of 50 to 80% (more preferably about 70%) of an area on a plane orthogonal to the optical axis, occupied by the effective light beam.

BEST MODE FOR CARRYING OUT THE INVENTION

The best mode for carrying out the invention is described in detail hereinafter with reference to the accompanying drawings.

First Embodiment

Figure 1:
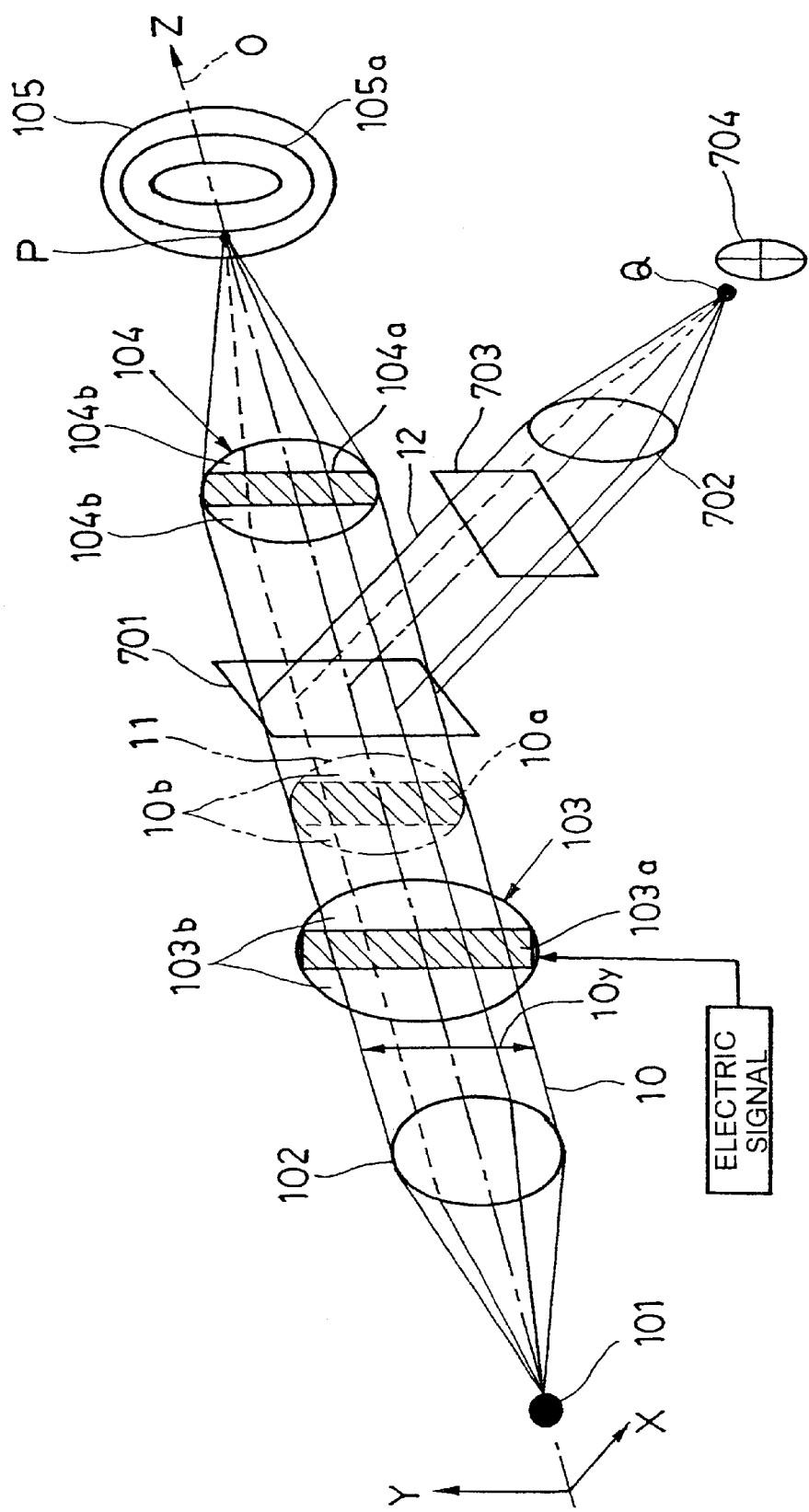
FIG. 1 is a schematic illustration of an optical system showing a configuration of a first embodiment of an optical apparatus according to the invention.

FIG. 1 is a schematic illustration of an optical system, showing a configuration of a first embodiment of an optical apparatus according to the invention, as is supposed to be applied to an optical disc system.

The optical apparatus according to this embodiment comprises a linearly polarized laser light source 101, a collimating lens 102, an optical rotatory element 103, a condensing optics 104, an optical splitting element 701, a condensing optics 702, a linearly polarized light detection element 703 and an optical detection element 704, thereby composing an optical system of an optical disc system.

Linearly polarized light 10 emitted from the linearly polarized laser light source 101 is turned into plane waves by the collimating lens 102. In this instance, the linearly polarized light 10 is assumed to have a polarization axis 10y oriented in the direction of the y-axis.

When the linearly polarized light 10 is transmitted through the optical rotatory element 103, the direction of the polarization axis 10y is rotated due to the optical rotatory power of the optical rotatory element 103. More specifically, the optical rotatory element 103 is composed of a region 103a wherein the linearly polarized light 10 falling thereon is rotated 0° (no optical rotation) to the direction of the x axis crossing the y axis at right angles, and regions 103b wherein the linearly polarized light 10 falling thereon is rotated 90° to the direction described.

In FIG. 1, the region 103a of the optical rotatory element 103, for causing optical rotation by 0° (no optical rotation) is formed in an oblong shape centering around the optical axis as indicated by hatching. Consequently, linearly polarized light 10a transmitted through the region 103a for causing optical rotation by 0° falls on a region 104a substantially oblong in shape, centering around the optical axis O of the condensing optics 104. The oblong region 104a corresponds to a portion of an effective light beam 11 falling on the condensing optics 104. Further, in FIG. 1, since a stop or the like for limiting the light beam falling on the condensing optics 104 is not used, the effective light beam 11 coincides with the beam of the linearly polarized light 10 transmitted through the optically rotatory element 103.

Meanwhile, linearly polarized light 10b transmitted through the regions 103b of the optical rotatory element 103, for causing optical rotation by 90° falls on regions 104b of the condensing optics 104, other than the oblong region.

In this instance, the polarization axis of the linearly polarized light falling on the oblong region 104a intersects that of the linearly polarized light falling on the regions 104b, other than the oblong region, at right angles. The linearly polarized light, with the respective polarization axes crossing each other at right angles as described above, do not interfere with each other, and consequently, behave as if they were shielded from each other. Hence, superresolution occurs.

Further, if the region 103a of the optical rotatory element 103, for causing 0° optical rotation is turned into a portion thereof for causing 90° optical rotation by controlling the optical rotatory power thereof with the use of electrical signals, this will eliminate an orthogonal relationship between the polarization axis of the linearly polarized light falling on the oblong region 104a of the condensing optics 104 and that of the linearly polarized light falling on the regions 104b of the condensing optics 104, other than the oblong region. As a result, a superresolving effect is eliminated and normal resolution occurs. The same applies to the case where the regions 103b of the optical rotatory element 103, for causing 90° optical rotation, are turned into portions thereof for causing 0° optical rotation.

In FIG. 1, as a portion of the oblong region 104a, in the x-axis direction, covers a portion of the effective light beam 11, superresolution occurs with respect to an x-axis component of the effective light beam 11 at a focused spot P formed by the condensing optics 104.

Accordingly, when recording information on an optical disc 105, a space between spiral recording grooves 105a of the optical disc 105, namely, a track pitch, can be reduced by disposing the optical disc 105 at the position of the focused spot P on the focal plane of the condensing optics 104 as well as by orienting the tangent line of each spiral recording groove 105a of the optical disc 105 so as to cross the x-axis at right angles, thereby enabling enhancement in recording density.

In the optical disc system shown in FIG. 1, the region 103a of the optical rotatory element 103, for causing 0° optical rotation, is formed in an oblong shape, but this may be formed in a circular shape centering around the optical axis. In this case, superresolution will occur with respect to components of the light in the directions of both the x-axis and y-axis. Furthermore, the region for causing 0° optical rotation need not be formed in an exact oblong or circular shape. Similar superresolution can occur, with the region 103a having some notches or warps. In addition, even if the center of the region 103a is somewhat off the optical axis of the optical system, sufficient superresolved image can be similarly formed.

A light beam reflected from the focused spot P on the optical disc 105 returns along substantially the same optical path as an incident optical path, and is split by the optical splitting element 701 after passing through the condensing optics 104. The apparatus is constructed such that the split light beam 12 is condensed again by the condensing optics 702, and a focused spot Q is detected by an optical detection element 704. The linearly polarized light detection element 703 is disposed in the optical path of the split light beam 12.

As the linearly polarized light detection element 703 is disposed such that the orientation thereof is set between the x-axis direction and the y-axis direction, the same has a function of eliminating an orthogonal relationship between the x-axis direction and the y-axis direction, thereby removing sidelobes from the focused spot Q. Accordingly, sidelobes can be removed from the focused spot Q without the use of a slit, or the like.

Second Embodiment

Figure 2:
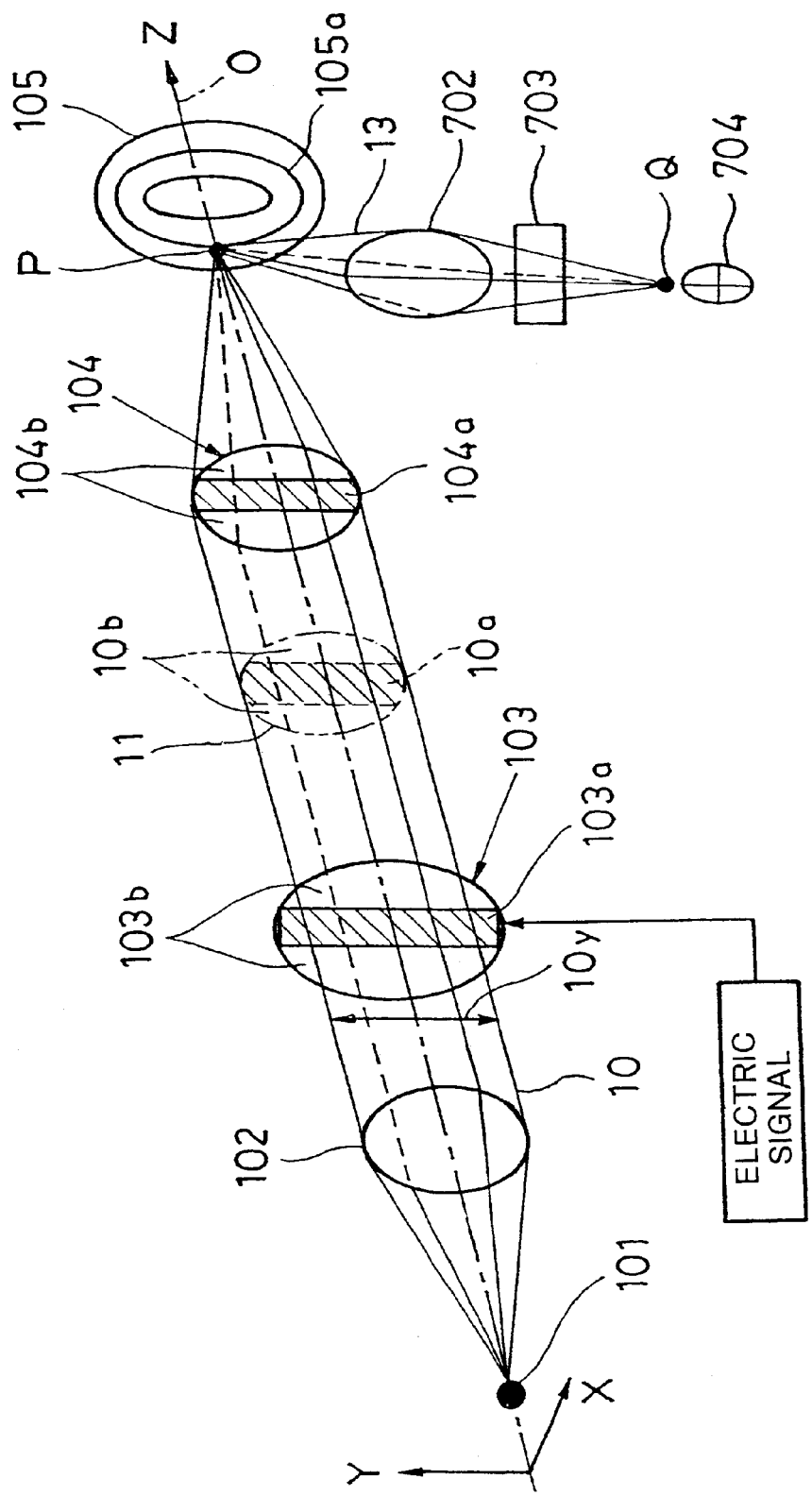
FIG. 2 is a schematic illustration of an optical system showing a configuration of a second embodiment of an optical apparatus according to the invention.

FIG. 2 is a schematic illustration of an optical system, showing a configuration of the second embodiment of the optical apparatus according to the invention. This embodiment represents an exemplary variation of the first embodiment, and in FIG. 2, parts corresponding to those described with reference to FIG. 1 are denoted by the same reference numerals.

With this embodiment, an optical splitting element is not employed, and instead, the optical system is constructed such that an optical disc 105 is tilted at an angle so as to enable it to double as the optical splitting element.

More specifically, by aligning the optical disc 105 in a tilted fashion, a focused spot P formed on the optical disc 105 can be reflected in an optional direction at varying tilt angles against the incident direction. Further, by disposing another condensing optics 702, and an optical detection element 704 on the reflection side of the focused spot P, a focused spot Q can be detected with the optical detection element 704.

Further, by aligning a linearly polarized light detection element 703 in the optical path of a light beam 13 reflected from the optical disc 105 as with the case of the first embodiment described above, sidelobes can be removed from the focused spot Q without the use of a slit, or the like.

In other respects, the configuration and the operation of this embodiment is the same as that for the first embodiment, so description thereof is therefore omitted.

Third Embodiment

Figure 3:
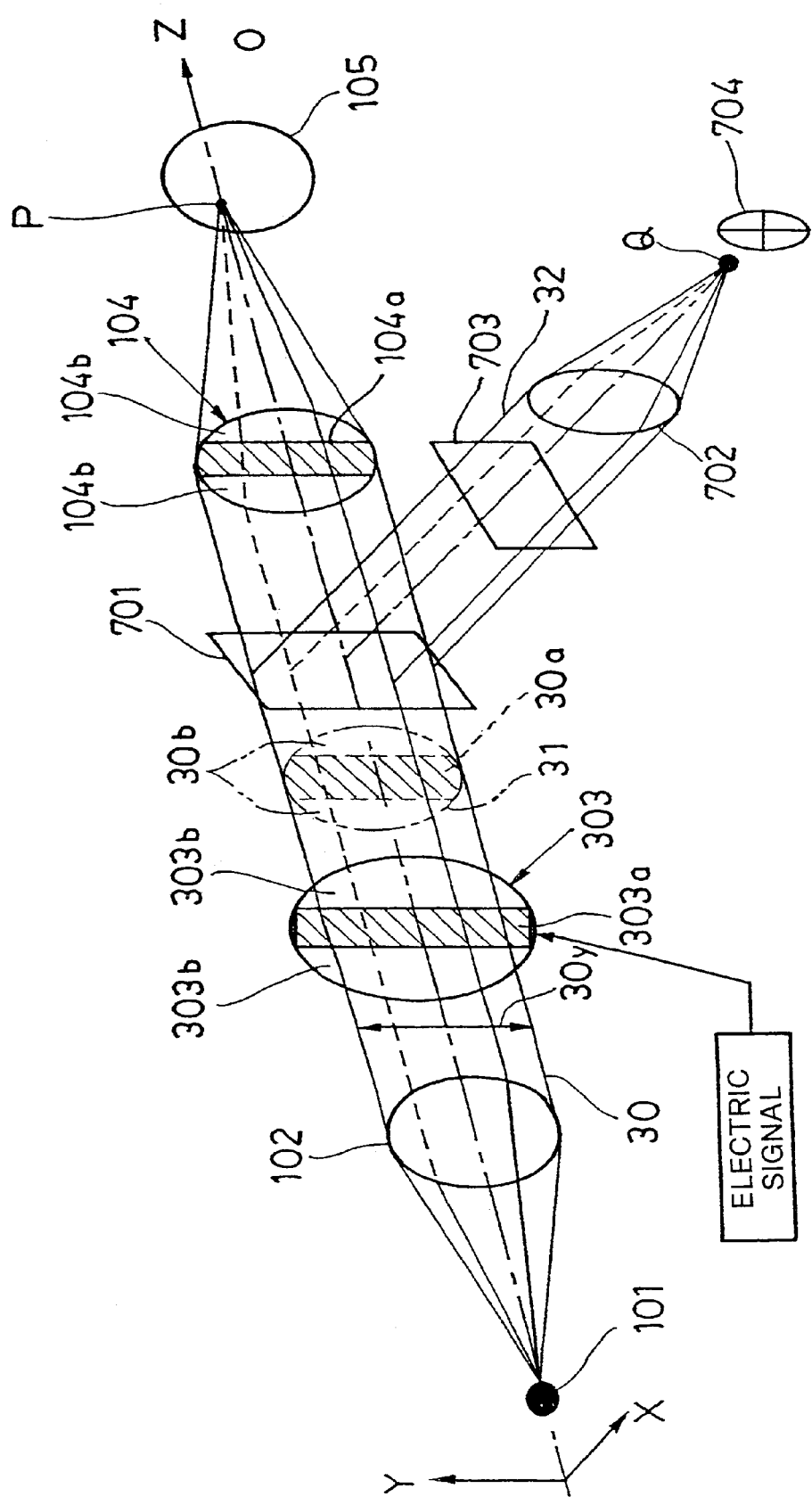
FIG. 3 is a schematic illustration of an optical system showing a configuration of a third embodiment of an optical apparatus according to the invention.

Next, a third embodiment of the invention will be described hereinafter. FIG. 3 is a schematic illustration of an optical system, showing a configuration of the third embodiment of an optical apparatus according to the invention, and in the figure, parts corresponding to those described with reference to FIG. 1 are denoted by the same reference numerals.

In this embodiment of the invention, a twisted nematic liquid crystal element 303 is employed for an optical rotatory element.

First, the optical rotatory power of twisted nematic liquid crystals will be briefly described hereinafter to facilitate understanding of the optical system shown in FIG. 3.

Figure 4A:
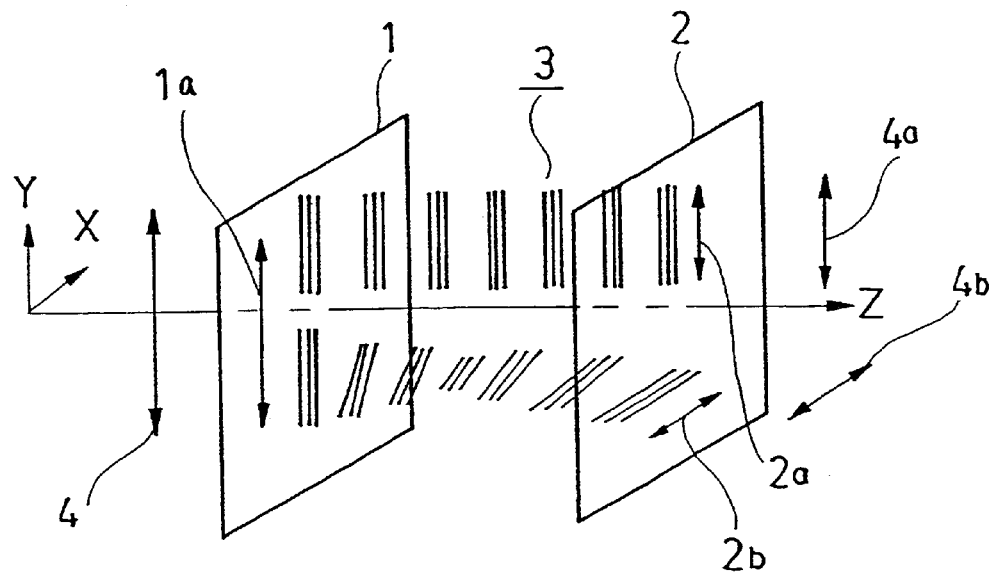
FIGS. 4A, and 4B are views schematically showing the optical rotatory property of a common twisted-nematic liquid crystal element which can be electrically controlled.
Figure 4B:
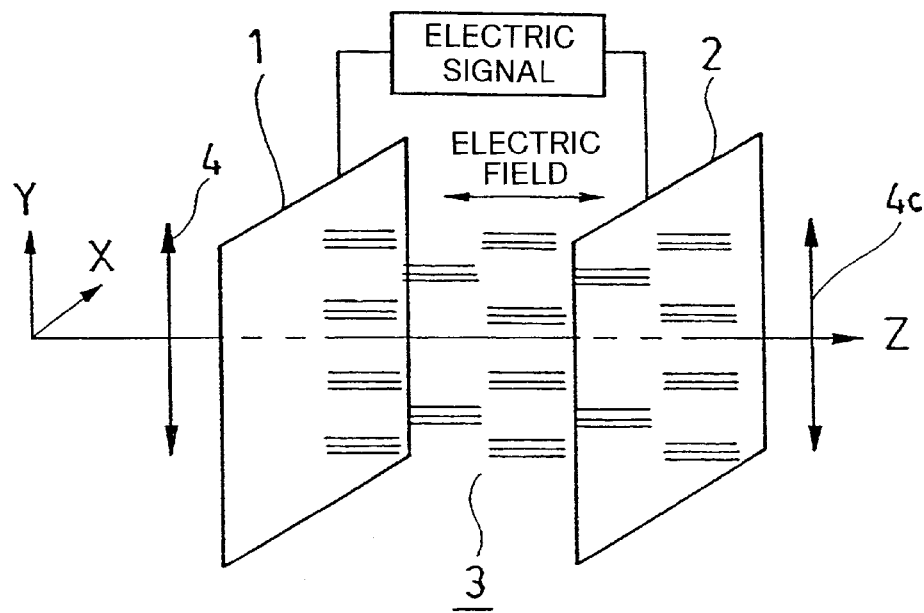

FIGS. 4A and 4B are schematic representations illustrating the optical rotatory power of a common twisted nematic liquid crystal element which can be controlled electrically.

As shown in FIG. 4A, the twisted nematic liquid crystal element is constructed such that liquid-crystal molecules 3 are filled between glass substrates 1 and 2, each coated with a transparent electrode. The glass substrate 1 on the incident light side has an alignment axis 1a oriented in the direction of the y-axis while the glass substrate 2 on the emergent light side has, for example, an alignment axis 2a oriented in the direction of the y-axis in the upper half region thereof, and an alignment axis 2b oriented in the direction of the x-axis crossing the y-axis at right angles in the lower half region thereof.

The liquid-crystal molecules 3 have properties of orienting long axes thereof in the direction of the alignment axes, respectively, as well as behaving as a continuum. As shown in FIG. 4A, the liquid-crystal molecules 3 are aligned parallel to each other in the upper half of the region of the glass substrate 2 on the outgoing light side owing to such properties. This state is called 'homogeneous'. Meanwhile, the liquid-crystal molecules 3 in the lower half region are rotated gradually and smoothly 90°. This state is called '90° twisted nematic'.

When linearly polarized incident light falls on a twisted nematic liquid crystal element having such properties as described above, the polarization axis of the linearly polarized incident light will be eventually aligned with the direction of the long axes of the liquid-crystal molecules 3 owing to dielectric anisotropy of the liquid-crystal molecules. That is, the polarization axis of linearly polarized emergent light is oriented in the direction 4a along the y-axis in the upper half region, and the polarization axis of linearly polarized emergent light in the direction 4b along the x-axis in the lower half region, thereby crossing each other at right angles.

Now, provided that the refractive index of the liquid-crystal molecules, in the direction of long axes thereof, is designated n1, the same in the direction of short axes thereof n2, and the thickness of the liquid-crystal layer is d, an optical path length of linearly incident light advancing in the liquid-crystal layer can be generally expressed for both the upper and lower half regions by a formula n1×d. To be exact, when the polarization axis 4 of the linearly polarized light falling thereon coincides with the direction of the alignment axis 1a on the incident light side (that is, the long axes of the liquid-crystal molecules), and when the result of the following formula is the square root of either of 3, 15, 35, and so on, is satisfied, the linearly polarized incident light emerges as linearly polarized light:

$$2\times(n1-n2)\times d \div \lambda \qquad (2)$$

where λ is the wavelength of incident light.

In practice, however, no particular problem arises even if the wavelength of light used, the refractive index of the liquid-crystal molecules, and the thickness of the liquid-crystal layer do not exactly satisfy the condition expressed by the formula described above. It is also possible to make necessary adjustments by slightly deviating the direction of the polarization axis 4 of the linearly polarized incident light from the direction of the alignment axis 1a on the incident light side.

Next, when an electric field in the direction of the z-axis (direction of light propagation) is applied to the liquid crystal element via the transparent electrodes coated on the glass substrates 1 and 2 (not shown) respectively, the long axes of the liquid-crystal molecules 3 become aligned in the direction of the z-axis which is the direction of the electric field, and come to rest as shown in FIG. 4B. This state is called 'homeotropic'.

With the liquid-crystal molecules 3 in the 'homeotropic' state, the polarization axis 4c of linearly polarized emergent light will be oriented in the same direction as that of the polarization axis 4 of the linearly polarized incident light, namely, the y-axis. That is, the optical rotatory power will be lost. Then, the optical path length of the linearly polarized incident light advancing through the liquid crystal layer becomes n2×d.

The optical system shown in FIG. 3 will be described hereinafter. This optical system, however, is shown herein to confirm the principle of the invention, and differs in respect of scale from that of an optical pickup for optical disc systems in general use.

The optical system of this embodiment also has basically the same configuration as that for the first embodiment shown in FIG. 1 except that a 90° twisted-nematic liquid-crystal element 303 is employed for the optical rotatory element.

The optical rotatory power of the common twisted nematic liquid crystal element is as described above with reference to FIGS. 4A and 4B, however, in this embodiment, homogeneous alignment is not utilized.

In the optical system shown in FIG. 3, the direction of the alignment axis of the liquid-crystal element 303 on a side where linearly polarized light 30 falls is set to substantially coincide with the direction of the polarization axis 30y of the linearly polarized light 30, both being oriented in the direction of the y-axis.

The linearly polarized light 30 emitted from a linearly polarized laser light source 101, and turned into plane waves by a collimating lens 102 falls on the liquid-crystal element 303 with the polarization axis 30y thereof oriented in the y-axis direction which is parallel with the plane of the drawing. The liquid-crystal element 303 is a twisted-nematic type, however, the same comprises a homeotropic region 303a and a 90° twisted-nematic regions 303b as the optical rotatory power of parts thereof is controlled by electrical signals. That is, a sufficient electric field is applied to liquid crystal molecules in the homeotropic region 303a by electric signals via transparent electrodes.

In this embodiment, the homeotropic region 303a is formed in an oblong shape centering around the optical axis. The length of the homeotropic region 303a, along the y-axis direction, is set to cover a beam region of the linearly polarized light 30, while the width thereof, along the x-axis direction, is set to cover a part of the beam region of the linearly polarized light 30.

It is effective to set an area of the oblong region, occupied within an effective light beam, is set to be in the range of 10 to 40% of an area on a plane orthogonal to the optical axis, occupied by the effective light beam.

The linearly polarized light 30, which has fallen on the homeotropic region 303a of the liquid crystal element 303 is transmitted therethrough without being optically rotated. Then, linearly polarized light 30a transmitted through the homeotropic region 303a falls on a substantially oblong region 104a centering around the optical axis O of a condensing optics 104.

In this instance, the oblong region 104a corresponds to a portion of an effective light beam 31 falling on the condensing optics 104. Further, with the optical system shown in FIG. 3, since a stop or the like for limiting a light beam falling on the condensing optics 104 is not employed, the effective light beam 31 coincides with the beam of the linearly polarized light 30 transmitting through the liquid-crystal element 303. Consequently, there will not be much loss in light, and the effective light beam 31 transmitted through the condensing optics 104 is condensed to form a focused spot P.

On the other hand, linearly polarized light 30b transmitted through the 90° twisted-nematic region 303b is optically rotated 90°, and falls on regions 104b of the condensing optics 104, other than the oblong region.

Polarization axes of the linearly polarized light falling on the oblong region 104a and the same falling on the regions 104b, other than the oblong region, cross each other at right angles. Consequently, a superresolved image is formed for a light component oriented in the x-axis direction at the focused spot P produced by the condensing optics 104.

Further, it is effective to set an area of the oblong region 104a, occupied within the effective light beam 31, so as to be in the range of 10 to 40% of an area on a plane orthogonal to the optical axis, occupied by the effective light beam 31.

Figure 5:
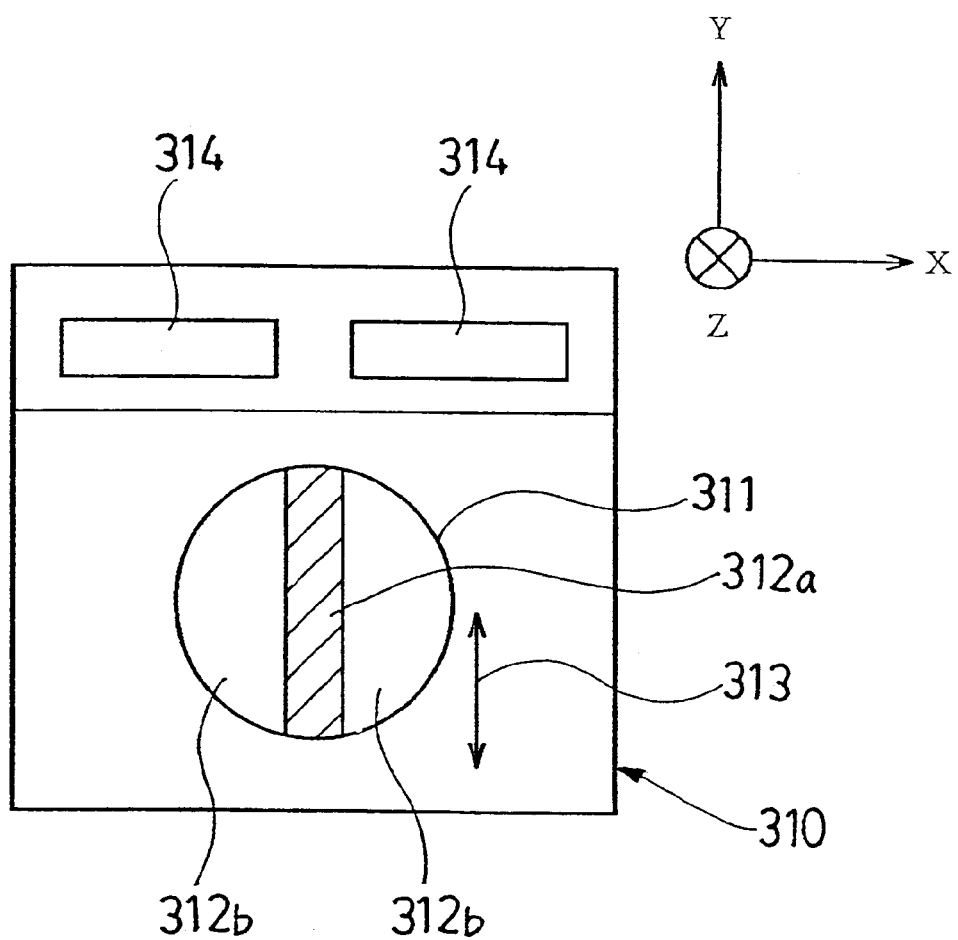
FIG. 5 is a view showing the construction of a twisted-nematic liquid crystal element manufactured by the inventor for use as an optical rotatory element of the invention.

FIG. 5 is a view showing the construction of a twisted-nematic liquid-crystal element manufactured by the inventor on an experimental basis for use in carrying out this embodiment.

The liquid-crystal element 310 shown in the figure has an outer shape, for example, about 15 mm square, and is provided with a light transmitting region 311 in which liquid-crystals are sealed, 10 mm in diameter, formed at the center thereof. A homeotropic region 312a, 1 mm in width and substantially oblong in shape, provided with transparent electrodes to which a voltage is applied by electric signals from electrodes, 314, 314, respectively, is formed in the center area of the light transmitting region 311, and a 90° twisted-nematic regions 312b are formed in the rest of the light transmitting region 311.

The direction 313 of an alignment axis of liquid crystal molecules on the incident light side coincides with the direction of the long sides of the homeotropic region 312a which is oblong in shape, and this direction is designated as the y-axis. The optical axis is extended in the direction of the z-axis, perpendicular to the plane of the drawing.

Further, with reference to the previously described formula (2), the liquid crystal element substantially satisfy the condition that the result of the formula should be the square root of 15 with respect to light at a wavelength of 633 nm.

When the twisted-nematic liquid-crystal element 310 described above is used for the liquid crystal element 303 shown in FIG. 3 as the optical rotatory element, the homeotropic region 312a thereof corresponds to the homeotropic region 303a, and the 90° twisted-nematic regions 312b thereof correspond to the 90° twisted-nematic region 303b.

In the optical system actually employed, the beam of the linearly polarized light was in the shape of a circle about 5 mm in diameter, and as the condensing optics 104, a lens with the focal length at 500 mm is disposed about 5 cm away from the liquid-crystal element 303.

Figure 6A:
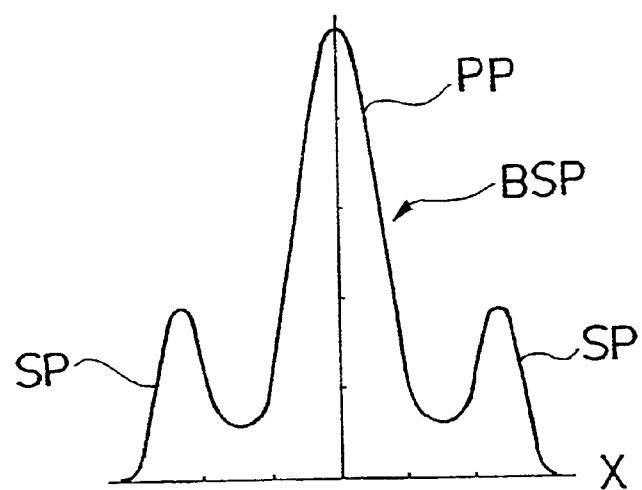
FIG. 6A is a view showing a sectional profile in the x-axis direction of a focused spot P formed by the optical system shown in FIG. 3.
Figure 6B:
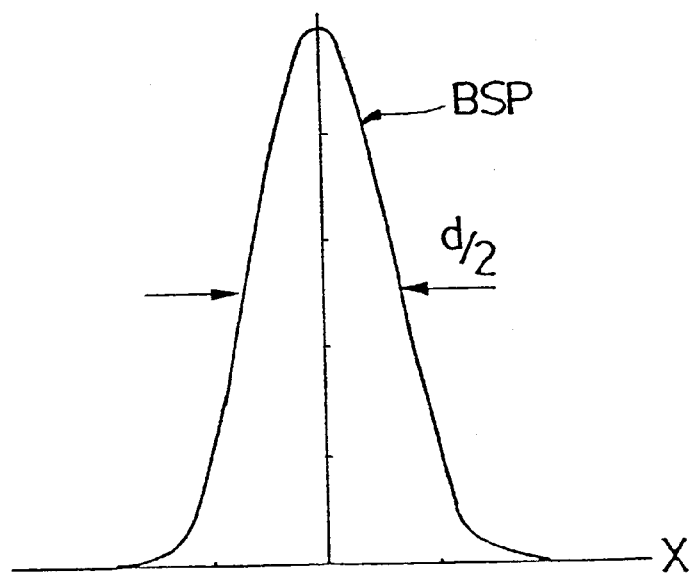
FIG. 6B is a view showing a sectional profile in the x-axis direction of a focused spot P formed by the same optical system except that a liquid-crystal element 303 has been removed.

FIG. 6A shows a sectional profile in the x-axis direction of the focused spot P formed by the optical system shown in FIG. 3 while FIG. 6B shows a sectional profile in the x-axis direction of a focused spot P formed in an optical system of the same configuration as shown in FIG. 3 except that the liquid-crystal element 303 is removed.

In the profile BSP of the focused spot shown in FIG. 6A, a half width d/2 of a peak profile PP occurring in the center thereof is seen to be narrower by 15% than that shown in the profile BSP of the focused spot shown in FIG. 6B, indicating formation of a superresolved image. The profile BSP in FIG. 6A shows that sidelobes SP occurred on both sides of the peak profile PP formed at the center.

The profile BSP shown in FIG. 6A was found to be nearly the same as a sectional profile in the x-axis direction of a focused spot P, obtained by an optical system of a configuration wherein an oblong shielding plate, 1 mm wide in the x-axis direction and 10 mm long in the y-axis direction, is disposed in the central region of the condensing optics 104 while the liquid-crystal element 303 of the optical system as shown in FIG. 3 is removed (that is, the configuration of a conventional optical apparatus).

When an entire liquid crystal region is turned back into a 90° optical rotatory region, by suspending to apply electric signals to the homeotropic region 303a of the liquid crystal element 303 shown in FIG. 3, a profile of a focused spot P was found to almost completely match up completely with that shown in FIG. 6B.

This occurs because a locally orthogonal relationship between the polarization axes of linearly polarized light is eliminated within the effective light beam 31, and it follows that a switchover between superresolution and normal resolution can be effected by the agency of electric signals.

Furthermore, even in the case of forming a superresolved image, the effect of superresolution was enhanced by applying an adequate bias voltage to the 90° twisted-nematic region 303b as well. This is because, as is seen with common twisted-nematic liquid crystals, when a bias voltage close to a voltage at which the liquid crystals are activated is applied beforehand, an optical rotatory phenomenon occurs more efficiently due to less birefringence.

Upon checking the optical utilization ratio, it was found that with this embodiment, attenuation of light power by about 15% due to the presence of the liquid-crystal element 303 was observed (refer to FIGS. 6A and 6B). However, it is possible to reduce attenuation of the light power to not more than 10% by applying a anti-reflective coating to the glass substrates of the liquid crystal element.

On the other hand, with the conventional optical apparatus of a configuration employing the shielding plate, attenuation of the light power, amounting to as much as about 40%, was observed.

With the optical system of the configuration shown in FIG. 3, even when the homeotropic region 303a of the liquid-crystal element 303 is turned into a 0° twisted-nematic liquid crystal region, and the 90° twisted-nematic region 303b into a homeotropic region, a superresolved image can be formed as well, because the polarization axes of the linearly polarized light passing through respective regions cross each other at right angles.

Now, the reflective type optical disc 105 which is a light reflection member is disposed on the same plane (the focal plane of the condensing optics 104) where the focused spot P is formed so as to cross the optical axis O substantially at right angles. Accordingly, a light beam condensed at the focused spot P is reflected from the surface of the reflective type optical disc 105 in the direction of the optical axis O.

The light beam thus reflected, is transmitted through the condensing optics 104 again, and is split by an optical splitting element 701. The optical splitting element 701 is disposed on the optical axis O, and halfway between the liquid crystal element 303 and the condensing optics 104.

A split light beam 32 split by the optical splitting element 701 is condensed by another condensing optics 702, forming a focused spot Q. The focused spot Q is detected by an optical detection element 704. Further, a linearly polarized light detection element 703 is disposed in the optical path of the split light beam 32.

The linearly polarized light detection element 703 has a function of removing sidelobes from the focused spot Q.

In the actual optical system, a prism beam splitter was employed for the optical splitting element 701, a lens with a focal length at 500 mm for the condensing optics 702, and a polarizing plate for the linearly polarized light detection element 703, respectively.

It is desirable to set the linearly polarized light detection element 703 such that the orientation of the detection axis thereof is in the range of minus 85° to minus 5° or 5° to 85° with respect to the direction of the polarization axis of the linearly polarized light 30 falling on the liquid-crystal element 303 as the optical rotatory element described above.

Figure 7A:
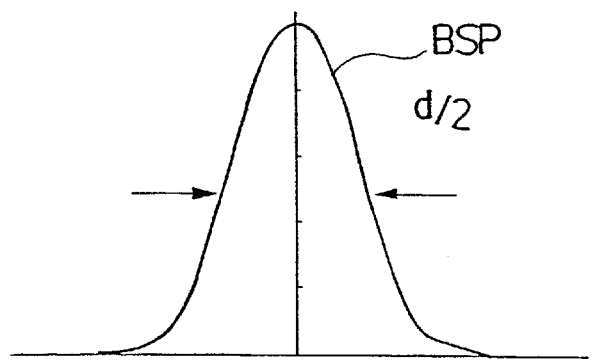
FIG. 7A is a view showing a profile of a focused spot Q detected by an optical detection element 704 in the optical system shown in FIG. 3.

FIG. 7A shows a profile BSP of the focused spot Q, as detected by the optical detection element 704 of the optical system according to the third embodiment shown in FIG. 3. Although the half width d/2 of the profile BSP was found to become larger, sidelobes were found to be removed. In this connection, an increase in the half width d/2 of the profile of the focused spot will have little effect on the detection of information recorded in the optical disc 105.

Figure 7B:
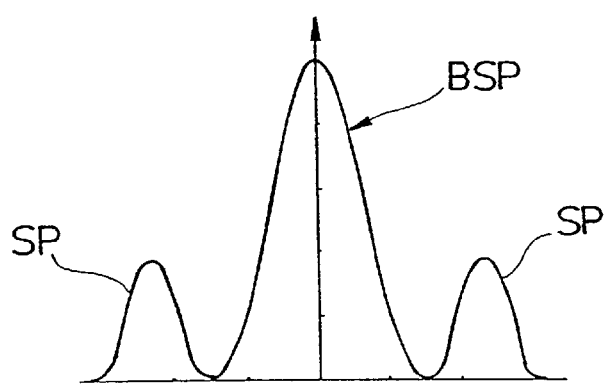
FIG. 7B is a view showing a profile of the focused spot Q detected by the optical detection element 704 of the same optical system except that a linearly polarized light detection element 703 has been removed.

FIG. 7B shows a profile BSP of the focused spot Q as detected by the optical detection element 704 when the optical system shown in FIG. 3 has a configuration wherein the linearly polarized light detection element 703 is removed. As shown in the figure, sidelobes SP are found to have occurred at the profile BSP of the focused spot. The sidelobes SP will become a source of signal noise when reproducing information recorded in the optical disc 105.

Figure 8:
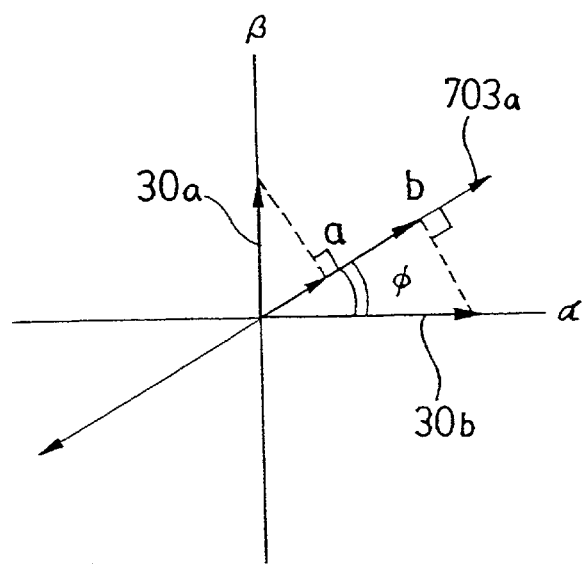
FIG. 8 is a view showing a direction of the detection axis of the linearly polarized light detection element 703 shown in FIG. 3.

FIG. 8 shows the orientation 703a of the linearly polarized light detection element 703 employed in carrying out this embodiment, that is, the orientation of the transmission axis of the linearly polarized light.

The light beam transmitted through the linearly polarized light detection element 703 comprises the linearly polarized light 30b optically rotated 90°, and the linearly polarized light 30a optically unrotated.

Assuming that in FIG. 8, the $\alpha$ axis is the direction of the polarization axis of the linearly polarized light 30b optically rotated 90°, and the $\beta$ axis is that of the linearly polarized light 30a optically unrotated, the sidelobes SP could be removed almost completely from the focused spot Q when the orientation of the linearly polarized light detection element 703 was arranged to form an angle of about 40° with respect to the $\alpha$ axis. It was subsequently confirmed that as an orientation $\phi$ of the linearly polarized light detection element 703 was varied gradually, the sidelobes SP emerged gradually.

As shown in FIG. 8, by setting the orientation 703a of the linearly polarized light detection element 703 between the $\beta$ axis and the α axis, orientation components a and b, respectively, of the linearly polarized light detection element 703 can be taken out of the linearly polarized light comprising components with the polarization axes thereof crossing each other at right angles. It is deemed that as a result of the above, the orthogonal relationship between the respective components of the linearly polarized light disappears after transmitted through the linearly polarized light detection element 703, thereby removing the sidelobes SP. In this connection, as is evident from FIG. 8, an equivalent phenomenon will result when the orientation of the linearly polarized light detection element 703 is tilted from $\phi°$ to $(\theta+90)°$.

Hence, it is desirable to set the linearly polarized light detection element 703 such that the orientation of the detection axis thereof is in the range of minus 85° to minus 5° or 50 to 85° with respect to the direction of the polarization axis of the linearly polarized light 30 falling on the liquid-crystal element 303 as the optical rotatory element described above.

As is evident from the foregoing description, with the optical apparatus according to the invention, having a superresolving feature and employing the optical rotatory element, a high optical utilization ratio can be achieved in comparison with the conventional superresolving optical apparatus employing the shielding plate, and the problem of sidelobes accompanying superresolution can be easily solved without addition of a condenser lens and a slit.

These features are quite suitable to an optical system for DVD-RAMs, namely writable or rewritable digital versatile discs (DVDs), holding great promise in the future. That is, because higher density DVD recording will be in demand in the future, and because the problem of increasing the light output of semiconductor lasers as a light source will be a difficult problem to solve.

Further, since the liquid crystal element employed in the optical apparatus of the invention is smaller in size as compared with a liquid crystal display panel of complex construction for use in personal computers, and the like, and is very simple in construction without need for mask rubbing etc., a particularly large increase in manufacturing cost will not result.

Furthermore, an inexpensive polarizing plate for use in liquid crystal displays, available in the market, can be used directly in carrying out the invention, and in comparison with the conventional method wherein a slit is installed at the position of a focused spot such that sidelobes only of the focused spot can be shielded, positioning can be executed with greater ease. Still further, the invention can have similar advantageous effects even when applied to transmission type optical discs.

Fourth Embodiment

Figure 9:
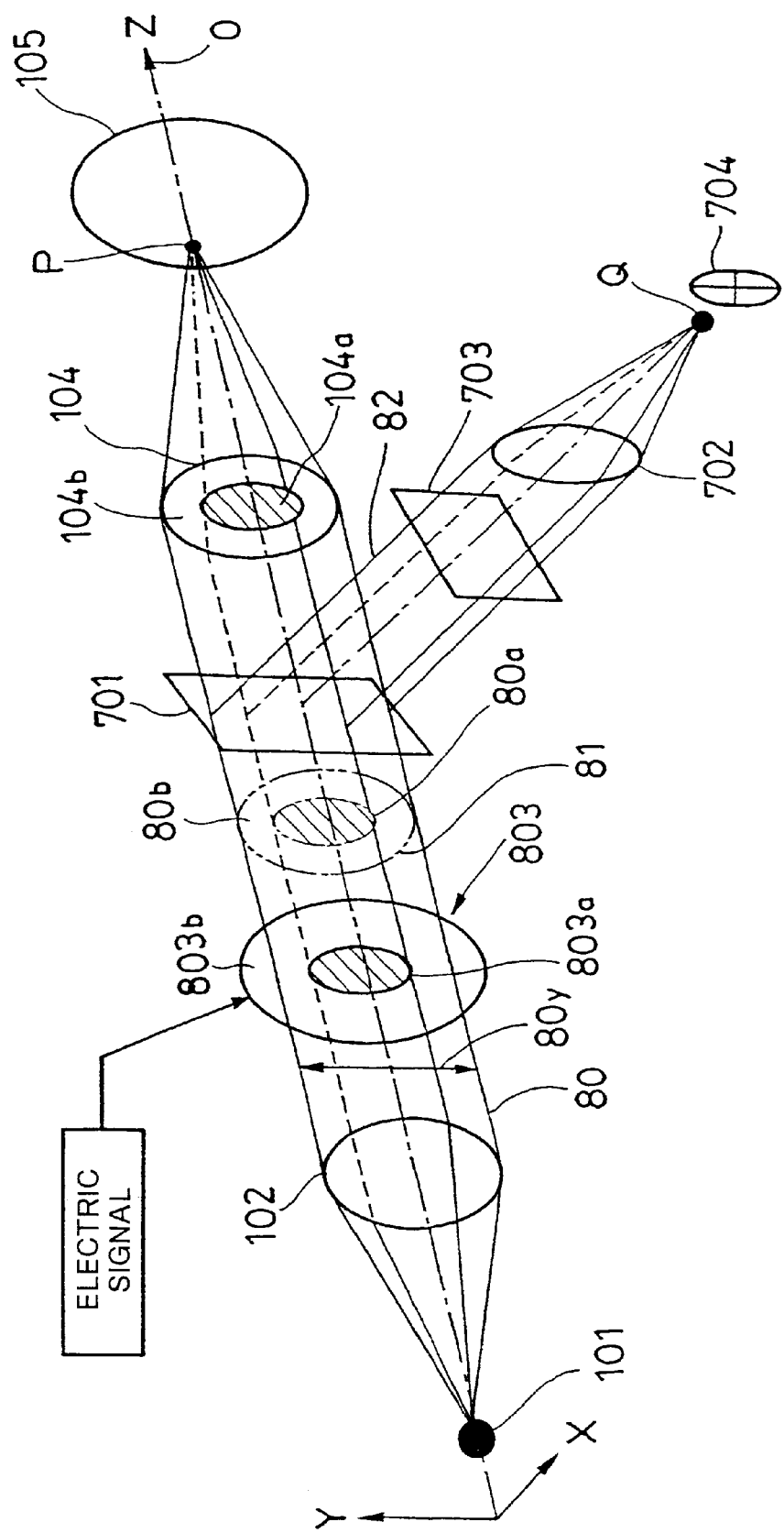
FIG. 9 is a schematic illustration of an optical system showing a configuration of a fourth embodiment of an optical apparatus according to the invention.

Next, a fourth embodiment of an optical apparatus according to the invention will be described hereinafter with reference to FIG. 9. FIG. 9 is a view showing a configuration of an optical system thereof. With this optical apparatus, a substantial aperture of a condensing optics can be switched over by electric signals so as to suit DVDs or CDs.

With this embodiment shown in FIG. 9, the optical system for optical disc systems comprises a linearly polarized laser light source 101, a collimating lens 102, a liquid crystal element 803 as an optical rotatory element, a condensing optics 104, an optical splitting element 701, a condensing optics 702, a linearly polarized light detection element 703 and an optical detection element 704.

Linearly polarized light 80 emitted from the linearly polarized laser light source 101 is turned into plane waves by the collimating lens 102. In this instance, the linearly polarized light 80 is assumed to have a polarization axis 80y oriented in the direction of the y-axis.

When the linearly polarized light 80 is transmitted through the liquid crystal element 803, the direction of the polarization axis 80y is rotated locally due to the optical rotatory function thereof. More specifically, the liquid crystal element 803 is able to create a region 803a wherein the linearly polarized light 80 falling thereon is rotated 0° (no optical rotation) in the direction of the x axis crossing the y axis at right angles, and a region 803b wherein the linearly polarized light 80 falling thereon is rotated 90° in the direction described.

The liquid crystal element 803 is a twisted-nematic liquid crystal element, and as described hereinbefore with reference to FIGS. 4A and 4B, can be switched over into either a 90° twisted-nematic state or a homeotropic state by applying electric signals thereto.

Figure 11:
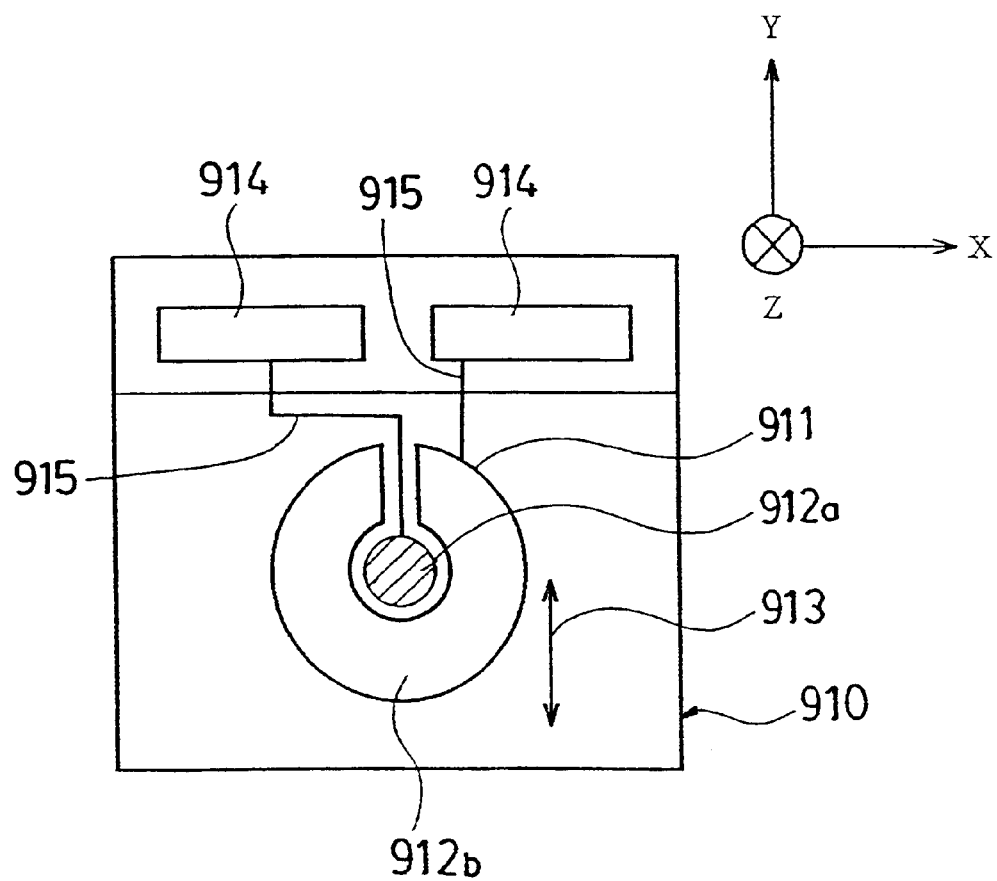
FIG. 11 is a view showing the construction of a twisted-nematic liquid crystal element manufactured by the inventor for use as an optical rotatory element in the fourth and fifth embodiments of the invention.

For example, as with the case of a liquid crystal element 910 shown in FIG. 11, the optical rotatory power of a circular region centering around the optical axis, and that of a region outside the circular region can be switched over independently from each other.

With the liquid crystal element 910 shown in FIG. 11, a light transmission region 911 with liquid crystals sealed therein is functionally divided into a homeotropic region 912a and a 90° twisted-nematic region 912b by means of electric signals. That is, a sufficient electric field is applied to liquid crystal molecules in the homeotropic region 912a by impressing a voltage thereon via transparent electrodes by means of electric signals. The homeotropic region 912a is the circular region centering around the optical axis. The transparent electrodes as well are patterned in the same circle as the homeotropic region 912a formed in a circular shape.

When the liquid crystal element 910 is employed for the liquid crystal element 803 as the optical rotatory element, as shown in FIG. 9, the homeotropic region 912a corresponds to a homeotropic region 803a of the liquid crystal element 803, and the 90° twisted-nematic region 912b a 90° twisted-nematic region 803b of the liquid crystal element 803.

In the optical system shown in FIG. 9, linearly polarized light 80a transmitted through the homeotropic region 803a of the liquid crystal element 803 falls on a substantially circular region 104a centering around the optical axis O of the condensing optics 104. The circular region 104a corresponds to a portion of an effective light beam 81 falling on the condensing optics 104, and has a smaller numerical aperture than that constituted by the effective light beam 81.

In this embodiment, the aperture constituted by the effective light beam 81 is set for application to DVDs, and the aperture constituted by the linearly polarized light 80a is set for application to CDs. Further, in FIG. 9, since a stop or the like for limiting a light beam falling on the condensing optics 104 is not used, the effective light beam 81 coincides with the beam of the linearly polarized light 80 transmitting through the liquid crystal element 803 as the optically rotatory element.

Meanwhile, linearly polarized light 80b transmitted through the 90° twisted-nematic region 803b of the liquid crystal element 803 falls on a region 104b of the condensing optics 104, other than the circular region.

In this connection, the polarization axis of the linearly polarized light falling on the circular region 104a intersects that of the linearly polarized light falling on the region 104b, other than the circular region, at right angles.

The light beam falling on the optical disc 105 returns along approximately the same optical path as an incident optical path, is transmitted again through the condensing optics 104, and is split by the optical splitting element 701. In this instance, a split light beam 82 keeps the initial state of polarization unless the optical disc 105 has intense birefringence and polarization dependence of diffraction. In the case of common optical discs, birefringence is as small as 20 nm or less, and polarization dependence of diffraction hardly occurs.

The split light beam 82 is again condensed by the condensing optics 702, forming a focused spot Q. The optical detection element 704 is disposed on the focused spot Q.

Further, the linearly polarized light detection element 703 is set in the optical path of the split light beam 82.

If the preferred orientation (the orientation of the detection axis allowing the linearly polarized light to be transmitted) of the linearly polarized light detection element 703 is adjusted, the polarization axis of the linearly polarized light 80b which is optically rotated 90° is caused to nearly coincide with or to cross at right angles the preferred orientation of the linearly polarized light detection element 703. Consequently, the linearly polarized light 80b, a component of the linearly polarized light, optically rotated 90°, will be shaded.

The linearly polarized light in the state as described is suited for reproduction of information recorded in CDs and CD-ROMs. That is, the linearly polarized light 80b optically rotated 90° is a light beam passing through the circumferential region of the condensing optics 104, having a large numerical aperture, and is a portion of the light beam, suitable for application to DVDs by nature. Accordingly, in the case that the same is applied to CDs, and the like, which have a disc substrate of thickness different from that of a disc substrate for DVDs, it will result in a reflected light beam having large aberration.

Such a reflected light beam as described will disfigure the focused spot Q, degrading the detection accuracy of the optical detection element 704. By shading the linearly polarized light 80b, a component optically rotated 90°, having adverse effects on reproduction of information recorded in CDs, and the like, it is possible to enhance reproduction accuracy of CDs and CD-ROMs.

On the other hand, in the case that the linearly polarized light is used for reproduction of information recorded in DVDs, the homeotropic region 803a of the liquid crystal element 803 may also be switched over to the 90° twisted-nematic region so that the linearly polarized light falling on the entire region of the liquid crystal element 803 can be optically rotated 90°. Then, all components of the effective light beam 81 will be transmitted through the linearly polarized light detection element 703, to form the focused spot Q.

Referring to FIG. 11, the shape of a liquid-crystal element actually used in carrying out the embodiment is described hereinafter by way of example.

The twisted-nematic liquid crystal element 910 has an outer shape of about 15 mm square, and is provided with the light transmitting region 911 with liquid crystals sealed therein, 10 mm in diameter, formed at the center thereof. The light transmitting region 911 is a 90° twisted-nematic type in alignment throughout the whole region thereof, and is electrically divided into a circular region 912a, 3 mm in diameter, formed in the center area thereof, and an outer region 912b formed outside the circular region 912a. That is, transparent electrodes are coated independently form each other in the each region 912a and 912b.

The circular region 912a is turned into a homeotropic region by an electric signal applied from one of the electrodes 914, and the outer region 912b to which no electric signal is applied is turned into a 90° twisted-nematic region.

The direction 913 of an alignment axis of liquid crystal molecules on the incident light side of the liquid crystal element 910 is set to be in the direction of the y-axis. The optical axis Z is extended in the direction perpendicular to the plane of the drawing. Further, the entire region of the light transmitting region 911 can be turned back into a 90° twisted-nematic region by suspending to apply an electric signal (voltage) to the transparent electrodes of the circular region 912a.

With the liquid crystal element of the construction described, it is necessary to run a lead wire 915 from the circular region 912a disposed at the center thereof, however, this will provide an advantage in that the optical rotatory power of the regions 912a and 912b, respectively, can be controlled independently. For example, the outer region 912b can be turned into a homeotropic region by applying an electric signal to the transparent electrodes thereof, so that the outer region 912b becomes a region having no optical rotatory power.

The liquid crystal element 910 substantially satisfies the previously described condition of the square root of 15 with respect to light of a wavelength of 633 nm.

In the case of this embodiment, it is desirable that an area of the substantially circular region 80a, occupied within the effective light beam 81 of the linearly polarized light shown in FIG. 9, is set to be in the range of 50 to 80%, most suitably 70%, of an area on a plane orthogonal to the optical axis, occupied by the effective light beam 81.

Fifth Embodiment

Next, a fifth embodiment of an optical apparatus according to the invention is described hereinafter with reference to FIG. 10.

This embodiment is substantially the same in configuration as the fourth embodiment described with reference to FIG. 9, and shows a case where a CD is disposed as a light reflection member 105. In FIG. 10, parts corresponding to those previously described with reference to FIG. 9 are denoted by the same reference numerals.

In this embodiment as well, a twisted-nematic liquid crystal element 903 is employed as an optical rotatory element.

Figure 10:
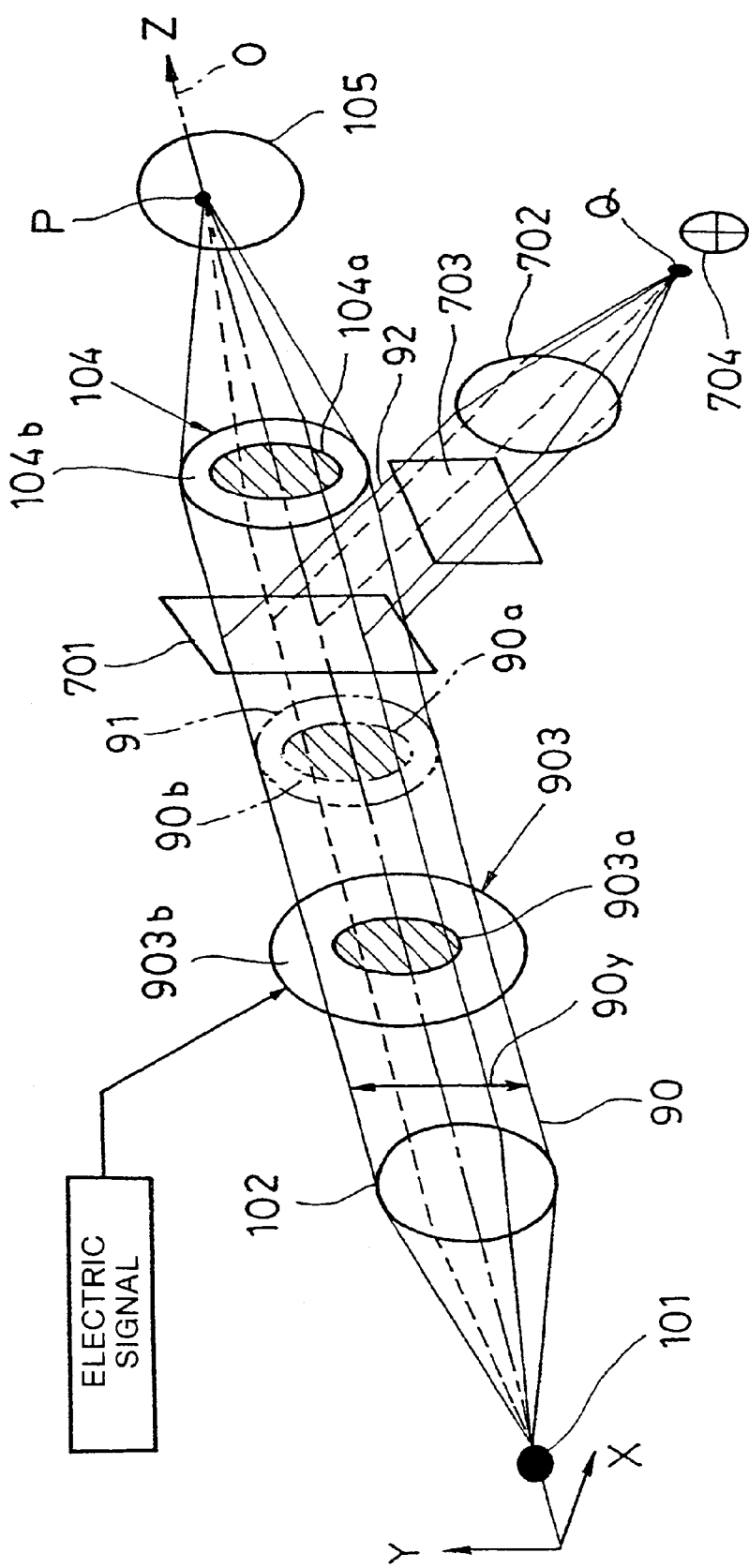
FIG. 10 is a schematic illustration of an optical system showing a configuration of a fifth embodiment of an optical apparatus according to the invention.

In the optical system shown in FIG. 10, the direction of the alignment axis of the liquid crystal element 903 on the incident side of linearly polarized light 90 is set to nearly coincide with the polarization axis 90y of linearly polarized light 90, both being oriented in the y-axis direction.

The linearly polarized light 90 emitted from a linearly polarized laser light source 101, and turned into plane waves by a collimating lens 102 falls on the liquid-crystal element 903. The liquid crystal element 903 can be switched over between a 90° twisted-nematic state and a homeotropic state by electric signals, and the optical rotatory power of a circular region, centering around the optical axis, and that of an outer region, outside the circular region, can be switched over independently from each other.

The liquid-crystal element 903 shown in FIG. 10 can be functionally divided such that the circular region indicated by slanting lines is turned into a homeotropic region 903a by applying a sufficient electric field thereto while the outer region is turned into a 90° twisted-nematic region 903b.

The linearly polarized light 90 which has fallen on the homeotropic region 903a of the liquid-crystal element 903 is transmitted therethrough without being optically rotated. Then, linearly polarized light 90a transmitted through the region 903a falls on a substantially circular region 104a centering around the optical axis O of a condensing optics 104.

In this instance, the circular region 104a corresponds to a portion of an effective light beam 91 falling on the condensing optics 104, and has a smaller numerical aperture than that constituted by the effective light beam 91.

In this embodiment, the numerical aperture constituted by the effective light beam 91 is set for application to DVDs, and the numerical aperture constituted by the circular region 104a is set for application to CDs.

Further, since a stop or the like for limiting a light beam falling on the condensing optics 104 is not used, the effective light beam 91 coincides with the beam of the linearly polarized light transmitting through the liquid-crystal element 903. Consequently, there will not be much loss in light, and the effective light beam transmitted through the condensing optics 104 is condensed to form a focused spot P.

Meanwhile, linearly polarized light 90b transmitted through the 90° twisted-nematic region 903b of the liquid-crystal element 903 is optically rotated 90°, and falls on an outer region 104b of the condensing optics 104, other than the circular region.

The twisted-nematic liquid crystal element used in carrying out this embodiment may have the same construction as that for the liquid crystal element 910 described with reference to FIG. 11.

Now, the optical disc 105 is disposed on the same plane where the focused spot P is formed so as to cross the optical axis O at right angles. The light beam condensed at the focused spot P is reflected from the surface of the optical disc 105, returns along substantially the same path as the incident optical path, and is split by an optical splitting element 701 after transmitted again through the condensing optics 104.

A split light beam 92 thus obtained is condensed by another condensing optics 702, forming a focused spot Q. The focused spot Q is detected by an optical detection element 704.

Further, a linearly polarized light detection element 703 is disposed halfway between the optical splitting element 701 and the optical detection element 704. The orientation (the direction in which the linearly polarized light can be transmitted) of the linearly polarized light detection element 703 is adjusted to be in the direction of the y-axis so as to take out only a component transmitted through the circular region 104a. Consequently, a component transmitted through the circumferential portion of the condensing optics 104, having a larger numerical aperture, can be shaded, enabling reproduction of information recorded in CDs.

Further, if the 90° twisted-nematic region 903b is turned homeotropic by applying an electric field thereto as well and is caused to lose its optical rotatory property, all components of the effective light beam 91 can be taken out, enabling the optical apparatus according to the invention to be put to use for DVDs and the like.

In an optical system manufactured by the inventor on an experimental basis, a polarizing plate was used for the linearly polarized light detection element 703, and the effective light beam 91 was set to be 5 mm in diameter.

A round through-hole may be made in the center portion of the polarizing plate to allow only the component transmitted through the circular region 104a to pass therethrough. An optical utilization ratio will be improved in this way since light is somewhat absorbed by the polarizing plate although the optical utilization ratio will not present much problem in this case because a photo diode in widespread use for the optical detection element 704 is highly sensitive as compared with other means.

Furthermore, even if an element, the entire region of which is composed of the 90° twisted-nematic liquid crystals, is used for the liquid crystal element 903, and a circumferential region of the liquid-crystal element, excluding the circular region thereof for use in the case of CDs, is converted into a homeotropic region by applying an electric field, the same effect can be obtained because polarization axes of the linearly polarized light transmitted through the circular region, and the circumferential region, respectively, cross each other at right angles.

Since the liquid crystal element 903 is used for the optical rotatory element, and the polarizing plate, or the like is not used in the optical path for incident light, loss in light amount will not, in theory, occur. The results of actual measurements indicated a loss in light in the order of 15%. However, it is possible to bring it down to 10% or less by applying anti-reflective coating to the glass substrates of the liquid crystal element.

Also in the case of this embodiment as well, it is desirable that an area of the substantially circular region 90a occupied within the effective light beam 91 shown in FIG. 10, is set to be in the range of from 50 to 80%, most suitably 70%, of an area of the effective light beam 91 on a plane orthogonal to the optical axis thereof, occupied by the effective light beam 91.

As is evident from the foregoing description of the fourth and the fifth embodiments of the invention, when the optical apparatus according to the invention, employing the optical rotatory element and the linearly polarized light detection element, is applied to optical disc systems, the numerical aperture thereof can be electrically switched over with ease without causing, in theory, a loss in light amount necessary for writing (or reading).

It follows that the optical apparatus of the invention is quite effective as an optical system for DVD-RAMs holding great promise in future, that is, writable or rewritable digital versatile discs (DVDs), which are capable of doubling as an optical system for the reproduction of information recorded in CDs. This is because to increase the light output of semiconductor lasers as a light source will pose a difficult problem.

Industrial Applicability

As described hereinbefore, the invention is applicable to various optical apparatuses utilizing superresolution techniques for optical disc systems, photolithographic masking systems used for fabrication of semiconductors, and so forth. Furthermore, if the invention is applied to an optical pickup in optical disc systems, one unit of the optical pickup can be used for both DVDs and CDs, and effective switchover in the aperture of the optical pickup can be executed with ease without causing degradation in the optical utilization ratio.

What is claimed is:

1. An optical apparatus comprising a condensing optics for condensing incident light of linearly polarized light, an optical splitting element for splitting reflected light reflected by a light reflection member disposed in close proximity of the focal plane of the condensing optics from the incident light, and an optical detection element for detecting split light beam split by the optical splitting element, said optical apparatus characterized in that;

an optical rotatory element capable of optically rotating 90° a polarization axis of the linearly polarized light in a region corresponding to a portion of an effective light beam of the linearly polarized light, available for the condensing optics, and controlling an optical rotatory power thereof by electric signals is disposed in the optical path of the incident light of the linearly polarized light; and a linearly polarized light detection element is disposed in the optical path of the split light beam; wherein the optical rotatory element is a liquid crystal element wherein a region having a function of optically rotating the poliarization axis of the linearly polarized 90° and a region not having such an optically rotatory function are caused to occur by applying a voltage to liquid crystals in a portion of a light transmitting region thereof, and an alignment direction of liquid crystal molecules on a side of the liquid crystal element, where the linearly polarized light falls, is set to coincide with, or cross at right angles the direction of the polarization axis of the linearly polarized light.

2. An optical apparatus according to claim 1, wherein the optical rotatory element is a 90° twisted-nematic liquid crystal element having transparent electrodes for applying a voltage to liquid crystals in a portion of the light transmitting region, and liquid crystal molecules in the portion to which a voltage is applied via the transparent electrodes turn homeotropic in alignment, thereby losing a 90° optically rotatory function thereof.

3. An optical apparatus according to claim 2, wherein the direction of a detection axis of the linearly polarized light detection element is set to be in the range of minus 85° to minus 5° or 5° to 85° in respect to the direction of the polarization axis of the linearly polarized light falling on the optical rotatory element.

4. An optical apparatus comprising a condensing optics for condensing incident light of linearly polarized light, an optical splitting element for splitting reflected light reflected by a light reflection member disposed in close proximity of the focal plane of the condensing optics from the incident light, and an optical detection element for detecting split light beam split by the optical splitting element, said optical apparatus characterized in that;

an optical rotatory element capable of optically rotating 90° a polarization axis of the linearly polarized light in a region corresponding to a portion of an effective light beam of the linearly polarized light, available for the condensing optics, and controlling an optical rotatory power thereof by electric signals is disposed in the optical path of the incident light of the linearly polarized light; and a linearly polarized light detection element is disposed in the optical path of the split light beam; wherein a region where the polarization axis of the linearly polarized light is optically rotated 90° by the optical rotatory element corresponds to a circular region centering around the optical axis of the linearly polarized light, or a region other than the circular region, within the effective light beam available for the condensing optics, wherein an area of the circular region, occupied within the effective light beam, is in the range of 1 to 20% of an area on a plane orthogonal to the optical axis, occupied by the effective light beam.

5. An optical apparatus according to claim 1, wherein a region where the polarization axis of the linearly polarized light is optically rotated 90° by the optical rotatory element corresponds to a circular region centering around the optical axis of the linearly polarized light, or a region other than the circular region, within the effective light beam available for the condensing optics.

6. An optical apparatus according to claim 2, wherein a region where the polarization axis of the linearly polarized light is optically rotated 90° by the optical rotatory element corresponds to a circular region centering around the optical axis of the linearly polarized light, or a region other than the circular region, within the effective light beam available for the condensing optics.

7. An optical apparatus according to claim 3, wherein a region where the polarization axis of the linearly polarized light is optically rotated 90° by the optical rotatory element corresponds to a circular region centering around the optical axis of the linearly polarized light, or a region other than the circular region, within the effective light beam available for the condensing optics.

8. An optical apparatus comprising a condensing optics for condensing incident light of linearly polarized light, an optical splitting element for splitting reflected light reflected by a light reflection member disposed in close proximity of the focal plane of the condensing optics from the incident light, and an optical detection element for detecting split light beam split by the optical splitting element, said optical apparatus characterized in that;

an optical rotatory element capable of optically rotating 90° a polarization axis of the linearly polarized light in a region corresponding to a portion of an effective light beam of the linearly polarized light, available for the condensing optics, and controlling an optical rotatory power thereof by electric signals is disposed in the optical path of the incident light of the linearly polarized light; and a linearly polarized light detection element is disposed in the optical path of the split light beam;

wherein a region where the polarization axis of the linearly polarized light is optically rotated 90° by the optical rotatory element corresponds to an oblong region centering around the optical axis of the linearly polarized light, or a region other than the oblong region, within the effective light beam available for the condensing optics; and wherein an area of the oblong region, occupied within the effective light beam, is in the range of 10 to 40% of an area on a plane orthogonal to the optical axis, occupied by the effective light beam.

9. An optical apparatus according to claim 1, wherein a region where the polarization axis of the linearly polarized light is optically rotated 90° by the optical rotatory element corresponds to an oblong region centering around the optical axis of the linearly polarized light, or a region other than the oblong region, within the effective light beam available for the condensing optics.

10. An optical apparatus according to claim 2, wherein a region where the polarization axis of the linearly polarized light is optically rotated 90° by the optical rotatory element corresponds to an oblong region centering around the optical axis of the linearly polarized light, or a region other than the oblong region, within the effective light beam available for the condensing optics.

11. An optical apparatus according to claim 3, wherein a region where the polarization axis of the linearly polarized light is optically rotated 90° by the optical rotatory element corresponds to an oblong region centering around the optical axis of the linearly polarized light, or a region other than the oblong region, within the effective light beam available for the condensing optics.

12. An optical apparatus comprising a condensing optics for condensing incident light of linearly polarized light, an optical splitting element for splitting reflected light reflected by a light reflection member disposed in close proximity of the focal plane of the condensing optics from the incident light, and an optical detection element for detecting a split light beam split by the optical splitting element, said optical apparatus characterized in that:

an optical rotatory element capable of optically rotating 90° a polarization axis of the linearly polarized light in a circular region centering around the optical axis of the linearly polarized light, or a region other than the circular region, within an effective light beam of the linearly polarized light, available for the condensing optics, and controlling an optical rotatory power thereof by electric signals is disposed in the optical path of the incident light of the linearly polarized light; and a linearly polarized light detection element having a detection axis thereof which is oriented so as to coincide with or to cross at right angles the direction of the polarization axis of the linearly polarized light is disposed in the optical path of the split light beam, wherein an area of the circular region, occupied within the effective light beam, is in the range of 50 to 80% of an area on a plane orthogonal to the optical axis, occupied by the effective light beam.

13. An optical apparatus according to claim 12, wherein the optical rotatory element is a liquid crystal element capable of turning one of a circular region in the center of a light transmitting region and a region thereof other than the circular region into a region having a function of optically rotating the polarization axis of the linearly polarized light by 90°, and the other into a region not having such an optical rotary function by applying a voltage to liquid crystals in the circular region or the region other than the circular region, and an alignment direction of liquid crystal molecules on a side of the liquid crystal element where the linearly polarized light falls is set to coincide with or to cross at right angles the direction of the polarization axis of the linearly polarized light.

14. An optical apparatus according to claim 13, wherein the optical rotatory element is a 90° twisted-nematic liquid crystal element having transparent electrodes for applying a voltage to liquid crystals in the circular region in the center of the light transmitting region or the region thereof other than the circular region, and liquid crystal molecules in the region where a voltage is applied via the transparent electrodes are turned homeotropic in alignment, thereby losing a function of 90° optical rotation.

* * * * *

UNITED STATES PATENT AND TRADEMARK OFFICE
CERTIFICATE OF CORRECTION

PATENT NO.    : 6,437,319 B1
DATED         : August 20, 2002
INVENTOR(S)   : Nobuyuki Hashimoto It is certified that error appears in the above-identified patent and that said Letters Patent is hereby corrected as shown below:

<u>Column 19,</u>
Line 3, change "polarized 90°" to be -- polarized light 90° --

Signed and Sealed this

Eighteenth Day of February, 2003

JAMES E. ROGAN
*Director of the United States Patent and Trademark Office*